G. J. CAPEWELL.
Carriage-Fender.

No. 68,951.            Patented Sept. 17, 1867.

Witnesses
Theo Fisch
Wm Trevrn

Inventor
G. J. Capewell
Per Munny &c
Attorneys

United States Patent Office.

GEORGE J. CAPEWELL, OF WEST CHESHIRE, CONNECTICUT.

Letters Patent No. 68,951, dated September 17, 1867.

---

IMPROVEMENT IN CARRIAGE-ATTACHMENT.

---

The Schedule referred to in these Letters Patent and making part of the same.

---

TO ALL WHOM IT MAY CONCERN:

Be it known that I, GEORGE J. CAPEWELL, of West Cheshire, in the county of New Haven, and State of Connecticut, have invented a new and improved Attachment to Carriages; and I do hereby declare that the following is a full, clear, and exact description thereof, which will enable others skilled in the art to make and use the same, reference being had to the accompanying drawings, forming part of this specification.

The present invention relates to a novel attachment to the body of wagons, carriages, and other vehicles, which attachment consists of a roller applied to the wagon at such points of the same as will serve as a fender to the front wheels, and prevent them from coming in contact with the wagon body as they are swung around in the act of turning the wagon, and also prevent the wheels from becoming cramped against the wagon body. In the accompanying plate of drawings my improved attachment is illustrated—

Figure 1:
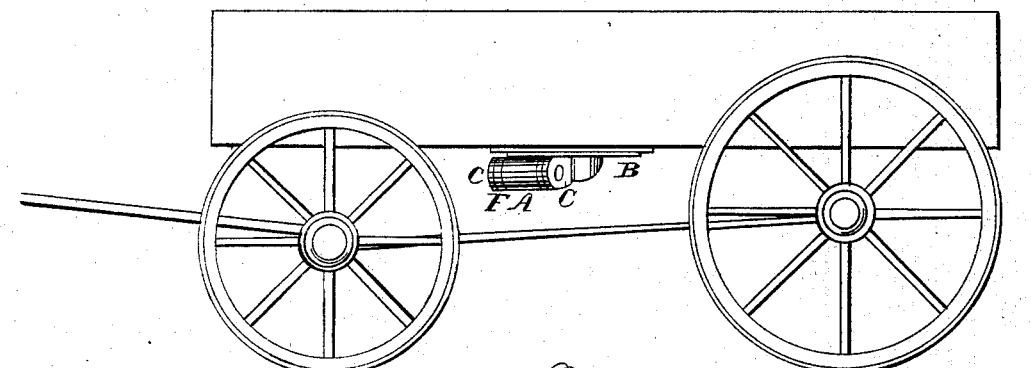
Figure 2:
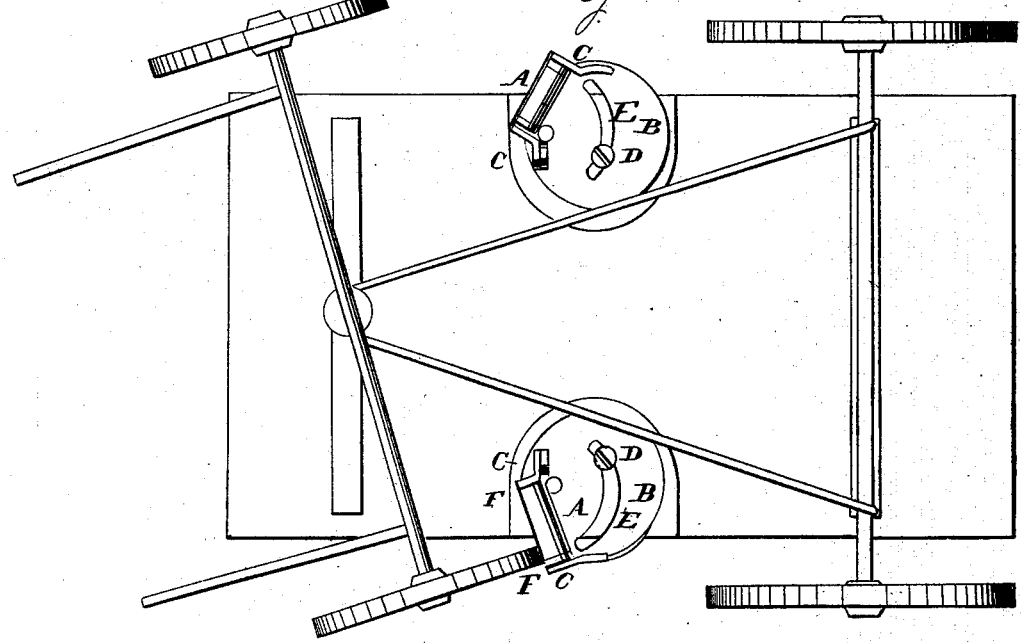

Figure 1 being a side view or elevation of a wagon having it applied thereto, and Figure 2 a plan view of the under side of the wagon body.

Similar letters of reference indicate like parts.

A A, in the drawings, represent the fender and cramp-rollers, one being provided for each side of the wagon body, to which they are both attached at the proper points of the same for the front wheels to act against them through plates or holders B, that are made of a circular shape, and provided with suitable bearings C for the rollers to turn in. These plates B are hung so as to swing upon the wagon body, they being fixed or made stationary by means of set-screws D passing through circular or arc-shaped slots E of the same, by which means the position of the rollers with reference to the side of the wagon body or the action of the wheels thereon can be changed and adjusted at pleasure, and according as may be desired or found necessary. The plates to which the rollers A are hung also act as steps to the wagon for facilitating the getting in and out of persons.

To prevent all lateral play of the rollers upon their holders, and thus the noise consequent thereon, I use at each end of the said rollers suitable washers F therefor, the rollers being made of rubber or other similar material to prevent any unpleasant noise arising from the running of the wagon-wheels against and in contact with them.

Having thus described my invention, what I claim as new, and desire to secure by Letters Patent, is—

1. A holder or plate B, for the fender-rollers A, made of such a form as to act as a step to the wagon or other vehicle, substantially as described.

2. Securing the fender-roller holders B to the vehicle in such manner that the rollers can be adjusted without detaching the holders, substantially as described for the purpose specified.

3. The washers F, at the ends of the rollers A, for the purpose described.

The above specification of my invention signed by me this    day of September, 1866.

GEORGE J. CAPEWELL.

Witnesses:
WM. F. MCNAMARA,
ALBERT W. BROWN.